United States Patent
Mokashi et al.

(10) Patent No.: US 10,534,934 B1
(45) Date of Patent: Jan. 14, 2020

(54) PROTECTION AGAINST ACCESSIBILITY SERVICE ABUSE

(71) Applicant: Symantec Corporation, Mountain View, CA (US)

(72) Inventors: Meghana Mokashi, Pune (IN); Anuj Sahai, Pune (IN)

(73) Assignee: Symantec Corporation, Mountain View, CA (US)

( * ) Notice: Subject to any disclaimer, the term of this patent is extended or adjusted under 35 U.S.C. 154(b) by 135 days.

(21) Appl. No.: 15/725,195

(22) Filed: Oct. 4, 2017

(51) Int. Cl.
*G06F 21/62* (2013.01)
*G06F 21/44* (2013.01)

(52) U.S. Cl.
CPC .......... *G06F 21/6281* (2013.01); *G06F 21/44* (2013.01); *G06F 21/6245* (2013.01)

(58) Field of Classification Search
CPC ... G06F 21/6281; G06F 21/6245; G06F 21/44
See application file for complete search history.

(56) References Cited

U.S. PATENT DOCUMENTS

| | | | | |
|---|---|---|---|---|
| 9,292,563 | B1* | 3/2016 | Engberg | G06F 16/84 |
| 2008/0235359 | A1* | 9/2008 | Natsuno | G06F 21/10 |
| | | | | 709/220 |
| 2011/0321139 | A1* | 12/2011 | Jayaraman | G06F 21/51 |
| | | | | 726/4 |
| 2015/0052619 | A1* | 2/2015 | Kwak | G06F 21/6245 |
| | | | | 726/28 |
| 2017/0180400 | A1* | 6/2017 | Demov | G06F 21/62 |
| 2018/0248698 | A1* | 8/2018 | Kominar | G06F 21/31 |

* cited by examiner

*Primary Examiner* — Cheng-Feng Huang
(74) *Attorney, Agent, or Firm* — Patent Law Works LLP

(57) ABSTRACT

An accessibility service protection application for hiding content of a first application from an accessibility service of a second application on a mobile computing device is described. The accessibility service protection application determines the first application currently active in foreground of the mobile computing device. The accessibility service protection application configures a transparent activity to hide content associated with the first application from the accessibility service of the second application. The accessibility service protection application launches the transparent activity on top of the first application, such that the transparent activity protects the content associated with the first application from the accessibility service of the second application.

20 Claims, 4 Drawing Sheets

PROTECTION AGAINST ACCESSIBILITY SERVICE ABUSE

TECHNICAL FIELD

This disclosure pertains generally to protecting data of applications on a mobile computing device from abuse, and more specifically to hiding content of a sensitive application from an accessibility service of a malware application.

BACKGROUND

With the widespread use of mobile computing devices such as smartphones, tablets and smart watches, users of these devices are exposed to malware and malicious activity that attempts to capture their personal, financial and other sensitive information. Accessibility services can be (mis) used to maliciously capture such information. An application may configure and register an accessibility service with a mobile operating system platform. Typically, such an accessibility service is to help users with physical, visual, or age-related limitations to use the application on their mobile computing devices. However, there can also be a vulnerability to having an accessibility service enabled for an application, especially a malware application on the mobile computing device. Under some mobile operating systems such as Android, an application with its accessibility service turned on is not limited to only monitoring a usage or content of that application on the mobile computing device. For example, if the accessibility service of a malware application is configured to handle certain types of accessibility events, then the malware application can interpret accessibility events of those types meant for other applications, monitor what the user is typing, and hijack user interactions for malicious purposes.

Accessibility services are a potential vector for leakage of sensitive user information on the mobile computing device. However, disabling accessibility services outright is problematic because, as noted above, accessibility services enhance the interaction of users with their mobile computing devices.

It would be desirable to address these issues.

SUMMARY

The content of a first application is hidden from an accessibility service of a second application, by a protection application executing on a mobile computing device, such as a smartphone or tablet running a mobile operating system such as Android®, iOS®, or Windows 10 Mobile®. The first application that is currently active in foreground of the mobile computing device is determined. A transparent activity to hide content associated with the first application from the accessibility service of the second application is configured. The transparent activity is launched on top of the first application, such that the transparent activity protects the content associated with the first application from the accessibility service of the second application. For example, the second application might be a malware application.

In one embodiment, an application usage history of the mobile computing device is accessed and the first application at the top of the application usage history is determined as the first application currently active in foreground of the mobile computing device. In another embodiment, the first application currently active in foreground of the mobile computing device is determined based on using a trusted accessibility service.

In one embodiment, a list of applications for which content is to be hidden from the accessibility service is determined. A determination is made as to whether the first application is present in the list of applications. If it is determined that the first application is present in the list of applications, the transparent activity is configured to hide content associated with the first application from the accessibility service. For example, the content associated with the first application can comprise content of an active window of the first application. In one embodiment, a determination is made as to whether the accessibility service of the second application is enabled on the mobile computing device. If it is determined that the accessibility service of the second application is enabled, the transparent activity is configured to hide content associated with the first application from the accessibility service of the second application. In another embodiment, the transparent activity is configured by setting a flag in the transparent activity to allow user interaction to pass through. The user interaction is received on a user interface of the mobile computing device. The user interaction is allowed to pass through the transparent activity to the first application and the content associated with the transparent activity is provided to the accessibility service.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A mobile computing device can have several useful applications that send and/or receive private and sensitive user information. For example, banking applications, messenger applications, electronic mail applications, etc., may send and/or receive account numbers, usernames and passwords, confidential business documents, etc., for example from the servers of a corresponding service provider. If an accessibility service for a malware application is enabled, then the malware application can access the private user information of other applications. The technology discussed herein can protect and prevent the abuse of the private user information by an accessibility service of the malware application.

Figure 1:
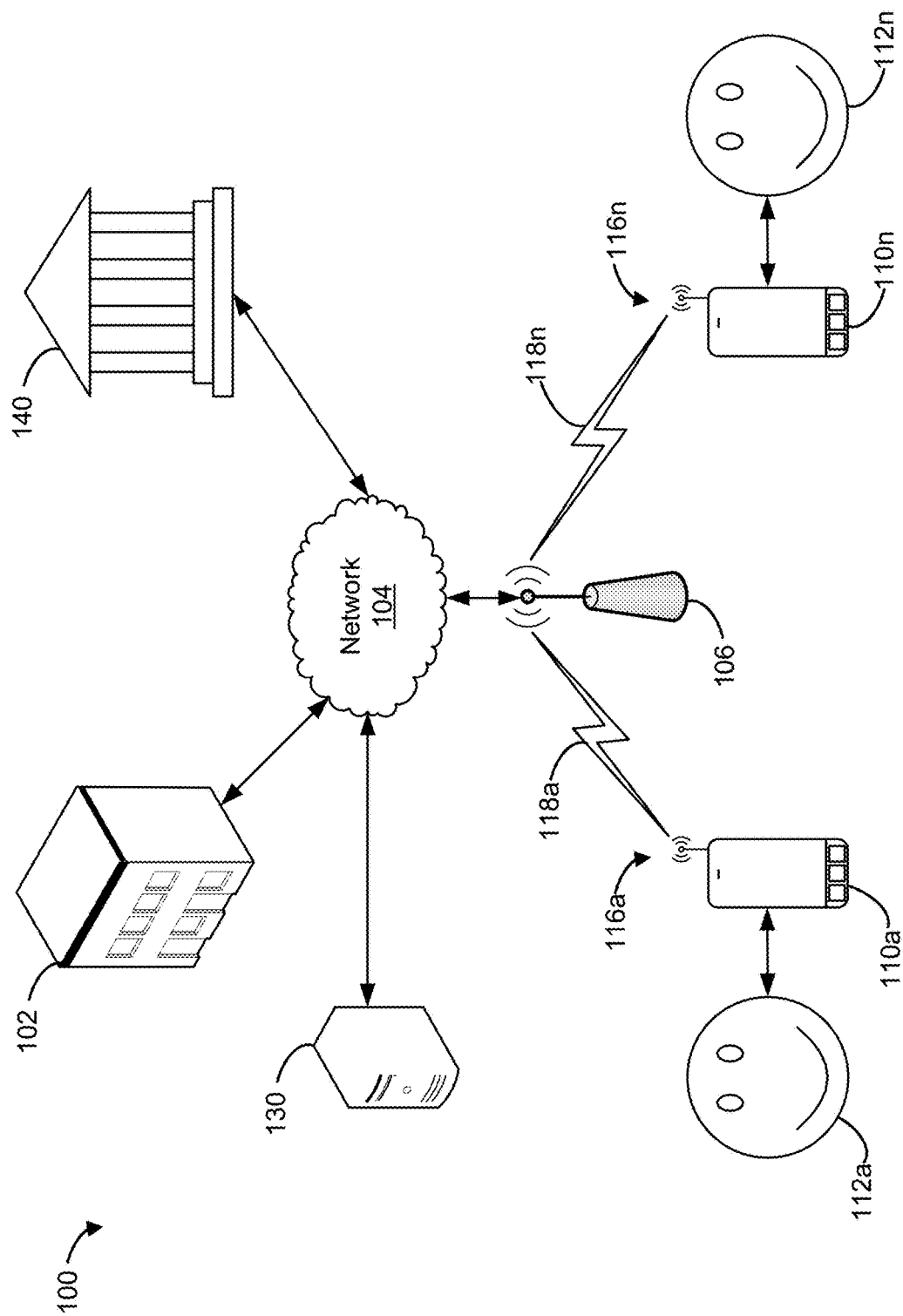
FIG. 1 is a schematic drawing of accessibility service abuse prevention, according to some embodiments.

FIG. 1 illustrates an environment 100 in which accessibility service abuse prevention can be provided, according to some embodiments. Amongst other things, the environment 100 includes multiple mobile computing devices 110a, . . . , 110n, a mobile telephony network 106, a network 104, a financial institution 140, a business 102, and an electronic mail server 130. Although FIG. 1 illustrates two mobile computing devices 110 as an example, in practice many more (or fewer) mobile computing devices 110 can be deployed. It is to be understood that this is an example only, and in various embodiments, the environment 100 can include institutions and/or servers of other service providers that receive, store, and/or send private user information and communicate with users 112a, . . . , 112n via mobile applications on their mobile computing devices 110a, . . . , 110n.

A user 112, as indicated by the control arrows, can operate a mobile computing device 110 that has a mobile telephony network interface 116 for interfacing with the mobile telephony network 106 over a wireless connection 118. While the mobile telephony network 106 is depicted as a single base station, it should be understood that a mobile telephony network 106 generally has significantly more base stations to which the mobile computing devices 110 and other data terminals can connect to, and which are in turn managed by a mobile network operator (not shown). One example technology that the mobile network operator may use to implement the mobile telephony network 106 is the long-term evolution (LTE) standard developed by the 3rd generation partnership project (3GPP). Other options are also possible, such as satellite networks or WiMax (802.16). Often times, the coverage area that the sum of the base stations of the mobile telephony network 106 cover may include a majority of a country's, or a regulatory body's, jurisdictional area. In some cases, various management components that the mobile network operator uses to manage the mobile telephony network 106 may operate over an intermediate network 104. Further, the network 104, while depicted as a single cloud, may include any number of intervening public and/or private networks. For example, the network 104 can be in the form of a private enterprise level wide area network and/or the Internet. Other networks 104 or network-based environments can be used in other embodiments.

Figure 2:
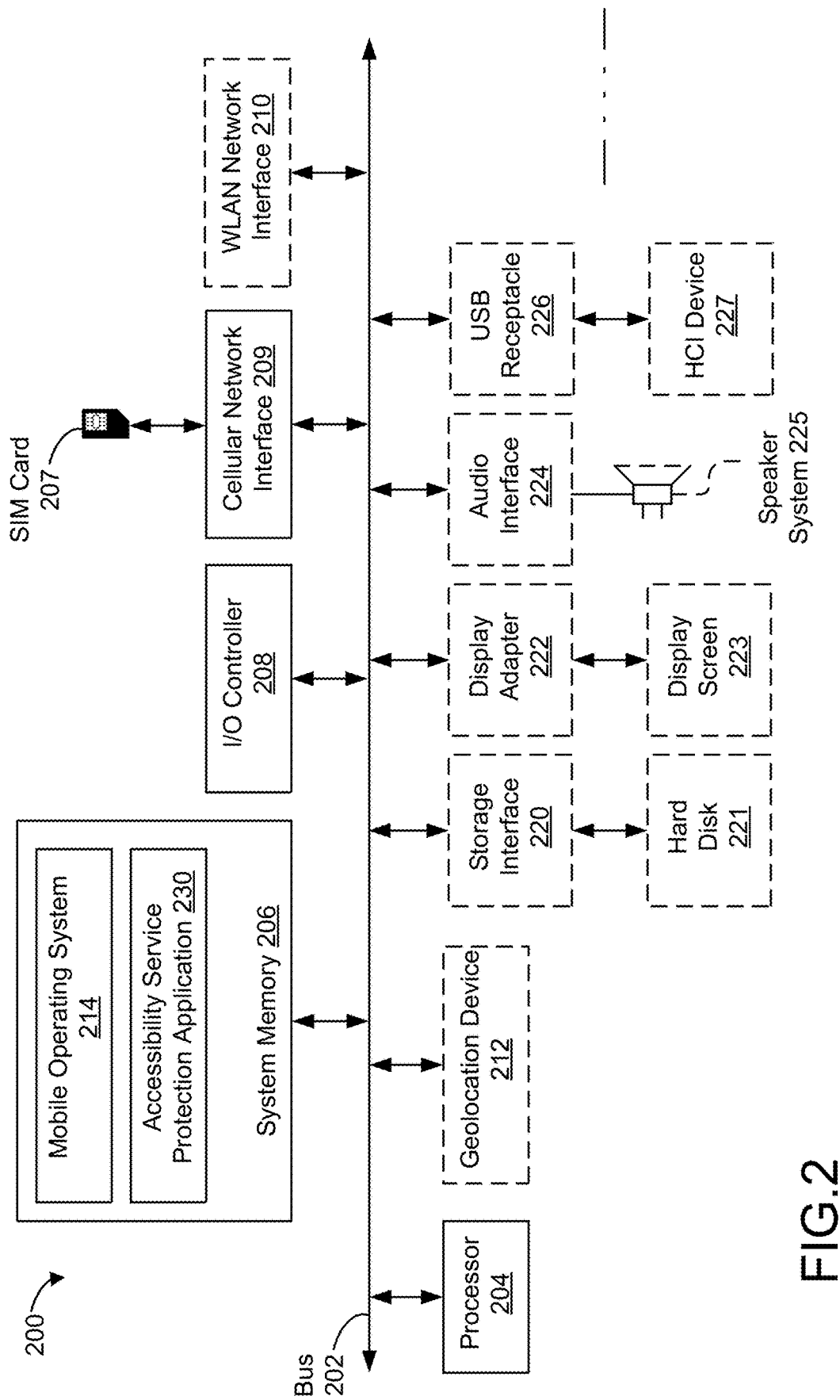
FIG. 2 is a block diagram of a computer system suitable for implementing an accessibility service protection application, according to some embodiments.

FIG. 2 is a block diagram of a computer system 200 suitable for implementing an accessibility service protection application 230, according to some embodiments. For example, the computer system 200 may be a mobile computing device such as a smartphone, tablet, smart watch, etc.

As illustrated, one component of the computer system 200 is a bus 202. The bus 202 communicatively couples other components of the computer system 200, such as at least one processor 204, system memory 206 (e.g., random access memory (RAM), read-only memory (ROM), flash memory), an input/output (I/O) controller 208, a cellular (or other type of mobile telephony) network interface 209, a WLAN network interface 210 and/or a geolocation device 212 (e.g., a GPS receiver).

The cellular network interface 209 and the WLAN network interface 210 may include a variety of protocols to connect to mobile telephony networks, local WiFi networks and/or the Internet. In general, the cellular network interface 209 may use a cellular network standard such as the LTE interface or the universal mobile telecommunications system (UTMS) interface, whereas the WLAN network interface may comport with the an Institute of Electrical and Electronics Engineers' (IEEE) 802.11 wireless local area network (WLAN) or wireless Ethernet interface. In some embodiments, the computer system 200 may have multiple network interfaces that provide connectivity to several types of networks concurrently or non-concurrently, such as that depicted in the computer system 200. The cellular network interface 209 may be communicatively coupled to a SIM card 207. The SIM card 207 is used to provide subscriber information to the mobile network operator (not shown) to gain access to the mobile telephony network 106.

Other components (not illustrated) may be connected in a similar manner. Conversely, all of the components illustrated in FIG. 2 need not be present. The various components can be interconnected in different ways from that shown in FIG. 2.

The bus 202 may also be communicatively coupled to other optional components such as a storage interface 220 communicatively coupled to one or more hard disk(s) 221 (or other form(s) of storage media), a display adapter 222 communicatively coupled to a video output device such as a display screen 223, an audio output interface 224 communicatively coupled to an audio output device such as a speaker 225, and one or more interfaces such as a universal serial bus (USB) receptacle 226 communicatively coupled to various peripherals such as human-computer interaction (HCI) devices 227 (e.g. keyboard, mice, sensors, etc.).

The bus 202 allows data communication between the processor 204 and system memory 206, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 221, flash memory, ROM, etc.) and loaded into system memory 206 and executed by the processor 204. Application programs can also be loaded into system memory 206 from a remote location (e.g., a remotely located server of a service provider or an online service), for example via the network interfaces. In FIG. 2, an accessibility service protection application 230 is illustrated as residing in system memory 206. The workings of the accessibility service protection application 230 are explained in greater detail below in conjunction with FIGS. 3-4.

A mobile operating system 214 is also illustrated as residing in system memory 206. The mobile operating system 214 may provide an interface between mobile applications and hardware of the computer system 200. For instance, the mobile operating system 214 may include drivers to control and receive data from the network interfaces 209, 210, geolocation device 212, etc. Further, the mobile operating system 214 may include an application programming interface (API) to provide application programs such as the accessibility service protection application 230 access to operating system services. The mobile operating system 214 may also provide a common operating environment for mobile applications. Some non-exhaustive examples of mobile operating systems are iOS®, Android® and Windows 10 Mobile®.

The storage interface 220 is coupled to one or more hard disks 221 (and/or other standard storage media). The hard disk(s) 221 may be a part of computer system 200, or may be physically separate and accessed through other interface systems.

Figure 3:
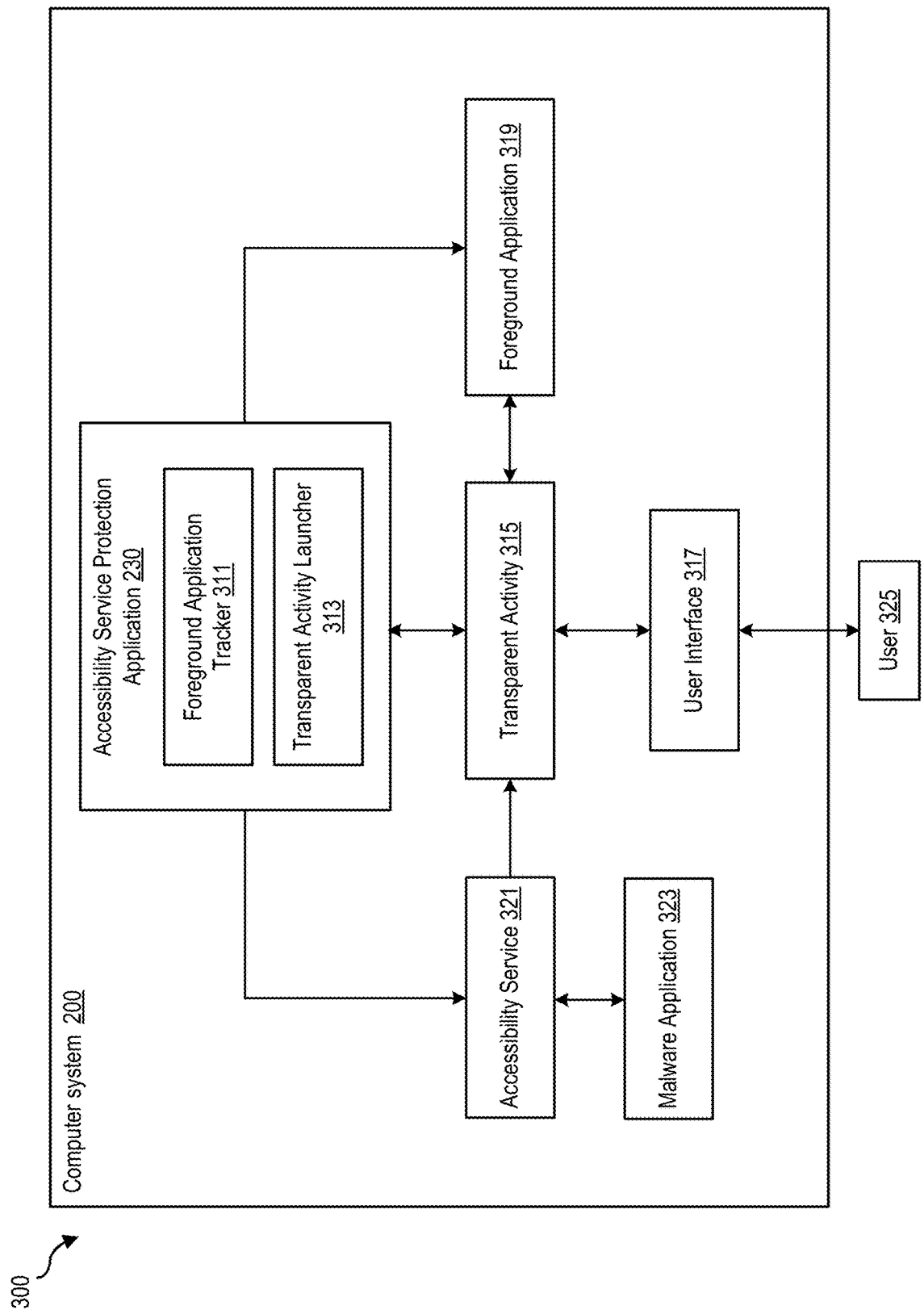
FIG. 3 is a block diagram of an accessibility service protection application, according to some embodiments.

FIG. 3 is a block diagram illustrating the operation 300 of an accessibility service protection application 230 running on a computer system 200, for example, a mobile computing device. It is to be understood that although the accessibility service protection application 230 is illustrated in FIG. 3 as a single entity, the illustrated accessibility service protection application 230 represents a collection of functionalities, which can be instantiated as a single or multiple modules as desired (instantiation of a specific, multiple module accessibility service protection application 230 is illustrated in FIG. 3). It is to be understood that the modules of the accessibility service protection application 230 can be instantiated (for example as object code or executable images) within the system memory 206 (e.g., RAM, ROM, flash memory) of any computer system 200, such that when the processor 204 of the computer system 200 processes a module, the computer system 200 executes the associated functionality. Additionally, program code to implement the functionalities of the accessibility service protection application 230 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As illustrated in FIG. 3, the accessibility service protection application 230 hides the foreground application 319 and its associated content from an accessibility service 321 of a second application, which may be a malware application 323 as illustrated in FIG. 3. The malware application 323 registers and configures the accessibility service 321 to handle one or more types of accessibility events triggered by a user 325 interacting with the computer system 200 using the user interface 317. For example, accessibility events can include but are not limited to a button press, a touch, a gesture, a scroll action, a finger swipe, etc. Once the accessibility service 321 is configured, the malware application 323 can use social engineering to trick the user 325 into turning on the accessibility service 321. Once the accessibility service 321 is turned on, the malware application 323 can abuse the capability of the accessibility service 321 to determine which application is currently running in the foreground of the mobile computing device based on the accessibility events. If the foreground application 319 is determined, then the malware application 323 can observe actions of the user interacting with the foreground application 319, query the content of the active window and read the sensitive information from the foreground application 319.

In order to hide the foreground application 319 and its associated content, the accessibility service protection application 230 launches a transparent activity 315 on top of the foreground application 319. Because the accessibility service 321 can only access the top activity, the accessibility service 321 is then restricted to have access only to the transparent activity 315 (i.e. top activity) and not the foreground application 319 now underneath it, which in turn protects the foreground application 319 from the malware application 323. Although FIG. 3 illustrates only one of each of the malware application 323 and the accessibility service 321 as an example, in practice there can be many more accessibility services 321 registered by different malware applications 323 installed on the computer system 200.

In one embodiment, the accessibility service protection application 230 includes a foreground application tracker 311 and a transparent activity launcher 313. In one embodiment, the foreground application tracker 311 is a trusted accessibility service that determines an application currently active in foreground of the mobile computing device. For example, when there is an accessibility event detected on the user interface 317, the foreground application tracker 311 determines the foreground application 319 to which the accessibility event is associated. In another embodiment, the foreground application tracker 311 can use an activity manager specific to a mobile platform operating system to retrieve information about a particular task that is currently running in the computer system 200. The activity manager provides the foreground application tracker 311 access to application usage history and statistics. The activity manager interacts with activities, services, and the containing process. For example, under Android®, the foreground application tracker 311 uses "ActivityManager.RunningTaskInfo," "getRunningTasks," "UsageStatsManager" and other similar class functions to determine a currently running task or activity at the top of the application usage history.

More specifically, in one embodiment, the foreground application tracker 311 can determine a list of applications that need to be protected from the accessibility service 321 of the malware application 323. For example, the user 325 can select one or more of banking applications (providing access to a bank account in the financial institution 140), messenger applications, electronic mail applications (providing access to personal or business emails in the electronic mail server 130), cloud storage applications, remote access applications (providing remote access to a business 102), and other applications that deal with user's private information, to be added to the list. The foreground application tracker 311 determines whether the detected foreground application 319 is present in the list of applications. For example, the foreground application tracker 311 compares the unique identifier of the foreground application 319 against the list of applications. If the foreground application 319 is present in the list of applications, the foreground application tracker 311 sends the information about the foreground application's 319 activity to the transparent activity launcher 313.

In one embodiment, the transparent activity launcher 313 determines whether the accessibility service 321 of the malware application 323 is enabled. Based on the received information about the foreground application 319 and the accessibility service 321 being enabled, the transparent activity launcher 313 configures the transparent activity 315 to hide and protect content associated with the foreground application 319 from the accessibility service 321 of the malware application 323. The transparent activity 315 can be configured in such a way as to allow user interactions (e.g., touch event) received by the user interface 317 to pass through to the foreground application 319. For example, for Android®, the transparent activity launcher 313 can set the window flag "WindowManager.LayoutParams.FLAG_NOT_TOUCHABLE" for the transparent activity 315 to allow the user interface events or actions made by the user 325 to pass through to the foreground application 319. In one embodiment, the transparent activity launcher 315 configures the transparent activity 315 to hide and protect content associated with the foreground application 319 from the accessibility service 321 of the malware application 323 without making a determination as to whether the accessibility service 321 of the malware application 323 is enabled. For example, even if (a) the transparent activity launcher 315 is not able to determine whether the accessibility service 321 of the malware application 323 is enabled, or (b) the malware application 323 hides the fact from the transparent activity launcher 313 that the accessibility service 321 is enabled, or (c) the malware application 323 is not yet installed on the mobile computing device, the transparent activity launcher 313 configures the transparent activity 315 regardless and hides and protects the foreground application 319.

The transparent activity launcher 313 launches the configured transparent activity 315 on top of the foreground application 319. The accessibility service 321 of the malware application 323 is tricked by the transparent activity launcher 313 into falsely identifying the transparent activity 315 as the top activity. The accessibility service 321 reads content and events of the transparent activity 315 instead of the foreground application 319 which is protected. The transparent activity launcher 313 receives user interaction on the user interface 317. For example, the user interaction can be in the form of a touch, a scroll, a swipe, etc. meant for the foreground application 319. The transparent activity launcher 313 allows the user interaction to pass through the transparent activity 315 to the foreground application 319 but the transparent activity launcher 313 provides the accessibility service 321 access only to content associated with the transparent activity 315. In one embodiment, the transparent activity launcher 313 can instantiate the transparent activity 315 on top of the accessibility service protection application 230 in order to protect the accessibility service protection application 230 from the accessibility service 321 of the malware application 323.

Figure 4:
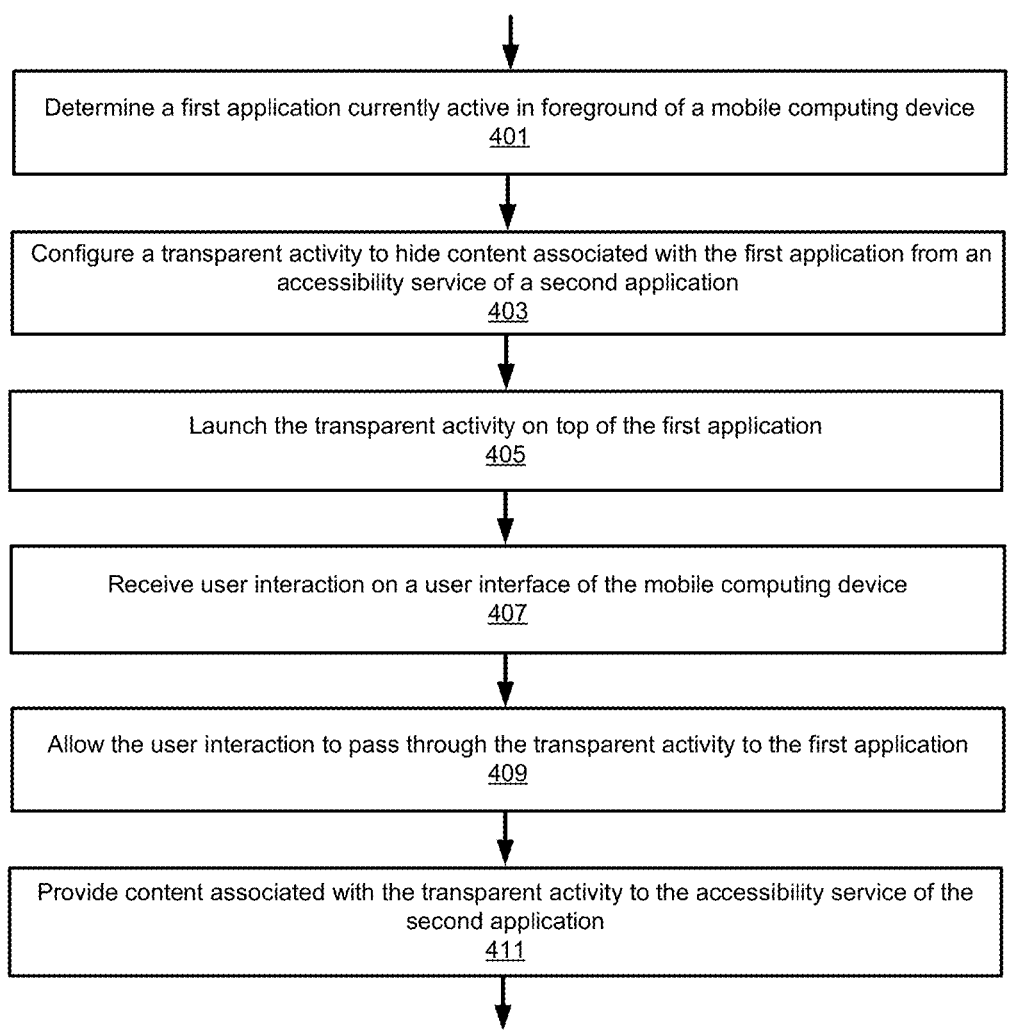
FIG. 4 is a flowchart of an example method for hiding content of a first application from an accessibility service of a second application.

FIG. 4 illustrates steps of a method 400 of operation of the accessibility service protection application 230, according to some embodiments. The foreground application tracker 311 determines 401 a first application currently active in the foreground of a mobile computing device. The transparent activity launcher 313 configures 403 a transparent activity to hide content associated with the first application from an accessibility service of a second application. The transparent activity launcher 313 launches 405 the transparent activity on top of the first application. The transparent activity launcher 313 receives 407 user interaction on a user interface of the mobile computing device. The transparent activity launcher 313 allows 409 the user interaction to pass through the transparent activity to the first application. The transparent activity launcher 313 provides 411 content associated with the transparent activity to the accessibility service of the second application.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for hiding content of a first application from an accessibility service of a second application, at least a portion of the method being performed by a mobile computing device comprising at least one processor, the method comprising the steps of:
   determining, by a protection application executing on the mobile computing device, the first application currently active in foreground of the mobile computing device;
   configuring, by the protection application executing on the mobile computing device, a transparent activity to hide content of the first application from the accessibility service of the second application and allow a user interaction received by a user interface of the mobile computing device to pass through the transparent activity to the first application;
   launching, by the protection application executing on the mobile computing device, the transparent activity on top of the first application, such that the transparent activity restricts access of the accessibility service of the second application to content of the transparent activity;
   receiving, by the protection application executing on the mobile computing device, the user interaction on the user interface of the mobile computing device;
   allowing, by the protection application executing on the mobile computing device, the user interaction to pass through the transparent activity to the first application; and
   providing, by the protection application executing on the mobile computing device, the content of the transparent activity to the accessibility service of the second application.

2. The computer implemented method of claim 1, wherein determining the first application currently active in the foreground of the mobile computing device further comprises:
   accessing an application usage history of the mobile computing device; and
   determining the first application at the top of the application usage history.

3. The computer implemented method of claim 1, wherein determining the first application currently active in the foreground of the mobile computing device is based on using a trusted accessibility service.

4. The computer implemented method of claim 1, wherein configuring the transparent activity to hide the content of the first application from the accessibility service of the second application further comprises:
   determining a list of applications for which content is to be hidden from the accessibility service of the second application;
   determining whether the first application is present in the list of applications; and
   responsive to determining that the first application is present in the list of applications, configuring the transparent activity to hide the content of the first application from the accessibility service of the second application.

5. The computer implemented method of claim 1, wherein configuring the transparent activity to hide the content of the first application from the accessibility service of the second application further comprises:
   determining whether the accessibility service of the second application is enabled on the mobile computing device; and responsive to determining that the accessibility service of the second application is enabled, configuring the transparent activity to hide the content of the first application from the accessibility service of the second application.

6. The computer implemented method of claim 1, wherein configuring the transparent activity to allow the user interaction received by the user interface of the mobile computing device to pass through the transparent activity to the first application further comprises setting a flag in the transparent activity.

7. The computer implemented method of claim 1, wherein launching the transparent activity on top of the first application tricks the accessibility service of the second application into identifying the transparent activity as a top activity on the mobile computing device.

8. The computer implemented method of claim 1, wherein the second application is a malware application.

9. The computer implemented method of claim 1, wherein the content of the first application comprises content of an active window of the first application.

10. The computer implemented method of claim 1, wherein the mobile computing device comprises a mobile operating system from a group consisting of Android operating system, iOS, and Windows 10 Mobile operating system.

11. A computer system for hiding content of a first application from an accessibility service of a second application, the computer system comprising:
a system memory;
a foreground application tracker residing on the system memory and being programmed to determine, by a protection application executing on a mobile computing device, the first application currently active in foreground of the mobile computing device;
a transparent activity launcher residing on the system memory and being programmed to configure, by the protection application executing on the mobile computing device, a transparent activity to hide content of the first application from the accessibility service of the second application and allow a user interaction received by a user interface of the mobile computing device to pass through the transparent activity to the first application, to launch the transparent activity on top of the first application, such that the transparent activity restricts access of the accessibility service of the second application to content of the transparent activity, to receive the user interaction on the user interface of the mobile computing device, to allow the user interaction to pass through the transparent activity to the first application, and to provide the content of the transparent activity to the accessibility service of the second application; and
at least one processor configured to execute the foreground application tracker and the transparent activity launcher.

12. The computer system of claim 11, wherein the foreground application tracker is further programmed to:
access an application usage history of the mobile computing device; and
determine the first application at the top of the application usage history.

13. The computer system of claim 11, wherein the foreground application tracker is further programmed to determine the first application currently active in the foreground of the mobile computing device based on using a trusted accessibility service.

14. The computer system of claim 11, wherein the transparent activity launcher is further programmed to:
determine a list of applications for which content is to be hidden from the accessibility service of the second application;
determine whether the first application is present in the list of applications; and
responsive to determining that the first application is present in the list of applications, configure the transparent activity to hide the content of the first application from the accessibility service of the second application.

15. The computer system of claim 11, wherein the transparent activity launcher is further programmed to set a flag in the transparent activity to allow the user interaction received by the user interface of the mobile computing device to pass through the transparent activity to the first application.

16. The computer system of claim 11, wherein the transparent activity launcher is configured to launch the transparent activity on top of the first application to trick the accessibility service of the second application into identifying the transparent activity as a top activity on the mobile computing device.

17. The computer system of claim 11, wherein the second application is a malware application.

18. The computer system of claim 11, wherein the content of the first application comprises content of an active window of the first application.

19. The computer system of claim 11, wherein the mobile computing device comprises a mobile operating system from a group consisting of Android operating system, iOS, and Windows 10 Mobile operating system.

20. At least one non-transitory computer-readable storage medium for hiding content of a first application from an accessibility service of a second application, the at least one non-transitory computer-readable storage medium storing computer-executable instructions that, when loaded into computer memory and executed by at least one processor of a mobile computing device, cause the mobile computing device to perform operations comprising:
determining, by a protection application executing on the mobile computing device, the first application currently active in foreground of the mobile computing device;
configuring, by the protection application executing on the mobile computing device, a transparent activity to hide content of the first application from the accessibility service of the second application and allow a user interaction received by a user interface of the mobile computing device to pass through the transparent activity to the first application;
launching, by the protection application executing on the mobile computing device, the transparent activity on top of the first application, such that the transparent activity restricts access of the accessibility service of the second application to content of the transparent activity;
receiving, by the protection application executing on the mobile computing device, the user interaction on the user interface of the mobile computing device;
allowing, by the protection application executing on the mobile computing device, the user interaction to pass through the transparent activity to the first application; and providing, by the protection application executing on the mobile computing device, the content of the transparent activity to the accessibility service of the second application.

\* \* \* \* \*